United States Patent
Matsumura (10) Patent No.: US 7,593,382 B2
(45) Date of Patent: Sep. 22, 2009

(54) INFORMATION PROCESSING DEVICE WITH AN EXTERNALLY CONNECTIBLE COMMUNICATION MODULE

(75) Inventor: Takashi Matsumura, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 679 days.

(21) Appl. No.: 10/925,384

(22) Filed: Aug. 25, 2004

(65) Prior Publication Data

US 2005/0058113 A1    Mar. 17, 2005

(30) Foreign Application Priority Data

Aug. 28, 2003   (JP)   ............. P. 2003-305531

(51) Int. Cl.
H04B 7/216     (2006.01)
H04M 1/00      (2006.01)

(52) U.S. Cl. ............. 370/342; 455/557; 455/574

(58) Field of Classification Search ............ 370/342; 455/90.3, 550.1, 556.1, 556.2, 558, 559, 455/574, 557

See application file for complete search history.

(56) References Cited

U.S. PATENT DOCUMENTS

| | | | |
|---|---|---|---|
| 6,459,778 B1 * | 10/2002 | Shirai | 379/93.29 |
| 6,725,060 B1 * | 4/2004 | Chhatriwala et al. | 455/556.2 |
| 6,760,600 B2 * | 7/2004 | Nickum | 455/557 |
| 6,930,655 B2 | 8/2005 | Adler | |
| 7,184,794 B2 * | 2/2007 | Hess et al. | 455/559 |
| 7,203,517 B2 * | 4/2007 | Shimoda et al. | 455/557 |
| 7,209,487 B2 * | 4/2007 | Seo | 370/401 |
| 7,221,961 B1 * | 5/2007 | Fukumoto et al. | 455/557 |
| 7,305,254 B2 * | 12/2007 | Findikli | 455/557 |
| 2001/0051537 A1 * | 12/2001 | Nakamura et al. | 455/571 |
| 2003/0025683 A1 | 2/2003 | Adler | |
| 2004/0082362 A1 * | 4/2004 | Peng et al. | 455/556.2 |
| 2004/0162109 A1 * | 8/2004 | Shimoda et al. | 455/557 |
| 2004/0229648 A1 * | 11/2004 | Yamamoto et al. | 455/557 |

FOREIGN PATENT DOCUMENTS

| | | |
|---|---|---|
| CN | 1226038 | 8/1999 |
| CN | 1379338 | 11/2002 |
| CN | 1380808 | 11/2002 |
| JP | 62102645 A | 5/1987 |
| JP | 2002225390 A | 8/2002 |
| JP | 2002-300644 | 10/2002 |
| WO | 03012607 A2 | 2/2003 |

OTHER PUBLICATIONS

Japanese language office action and its English language translation for corresponding Japanese application 2003305531 lists the references above, Aug. 13, 2008.

Japanese language office action and its English language translation for corresponding Japanese application 2003305531 lists the references above.

* cited by examiner

Primary Examiner—Quochien B Vuong
(74) Attorney, Agent, or Firm—Hogan & Hartson LLP (57) ABSTRACT

A CPU executes various types of processing that can be executed in an information processing device. A communication module executes communication processing conforming to EV-DO and cdma2000 1x. A connection terminal is a connector for communicating data to and from an external unit. A switch section can switch between connection of the connection terminal and the CPU and connection of the connection terminal and the communication module. A switch has a function for the user to switch the switch section. A display section mainly displays the processing result of the CPU. A notification section is an LED, etc., controlled by the communication module.

2 Claims, 5 Drawing Sheets

INFORMATION PROCESSING DEVICE WITH AN EXTERNALLY CONNECTIBLE COMMUNICATION MODULE

BACKGROUND OF THE INVENTION

1. Field of the Invention

The present invention relates to an information processing device and in particular to an information processing device having a communication function.

2. Description of the Related Art

Recently, cdma2000 1×EV-DO (hereinafter referred to as EV-DO) has been developed as a next-generation high-rate radio communication system. The EV-DO is a version of specializing cdma2000 1× provided by expanding cdma2000 to the third-generation system for data communications and increasing the transmission rate. "EV" means Evolution, and "DO" means Data Only.

The EV-DO system is approximately the same as the cdma2000 1× system in the configuration of a radio interface of an upstream channel from a radio communication terminal to a base station. As for the configuration of the radio interface of a downstream channel from a base station to a radio communication terminal, whereas the bandwidth of 1.23 MHz is the same with that of the cdma2000 1× system, the modulation method and the multiplexing method are much different from those of the cdma2000 1× system. As for the modulation method, whereas QPSK and HPSK are used in the cdma2000 1× system, QPSK, 8-PSK, or 16QAM is selectively used in the EV-DO system according to a reception state of a downstream channel of a radio communication terminal. As a result, a high transmission rate with low error resistance is used when the reception state is good, and a low transmission rate with high error resistance is used when the reception state is bad.

As for the multiplexing method for enabling multiple communications from one base station to a plurality of radio communication terminals, TDMA (Time Division Multiple Access) is employed in which communications with a plurality of radio communication terminals are performed in such a manner that time is divided in units of 1/600 second, a communication is performed with one radio communication terminal in each unit time, and the radio communication terminal to be communicated is switched every unit time, rather than CDMA (Code Division Multiple Access) which is employed in the cdmaOne system and the cdma2000 1× system.

A radio communication terminal measures a carrier-to-interference power ratio (hereinafter abbreviated as CIR) of a pilot signal as an index of a reception state of a downstream channel from a base station to be communicated, predicts a reception state during the next reception time slot on the basis of a variation of the CIR, and notify "a maximum transmission rate which enables to receive with a error ratio that is lower than a predetermined rate", which is expected from the predicted reception state to the base station as data rate control bits (hereinafter referred to as DRC) predetermined. The predetermined error rate is usually set to about 1% though it depends on the system design. The base station receives the DRCs from a plurality of radio communication terminals, and a scheduler function in the base station determines with which radio communication terminal is to communicate in each division unit time. Basically, as high a transmission rate as possible is decided on the basis of a DRC sent from each radio communication terminal and is used for a communication with it.

With the above configuration, the EV-DO system enables a maximum transmission rate of 2.4 Mbps (mega-bits per second) per sector in a downstream channel. This transmission rate is the sum of amounts of data communications from one base station to a plurality of radio communication terminals in one frequency band and in one of a plurality of sectors (usually, a plurality of sectors exist). The transmission rate increases if a plurality of frequency bands are used.

JP-A-2002-300644 is known as a related art.

A personal handyphone system, PDC, cdmaOne, CDMA2000 1×, and the like are originally intended for voice communication. In recent years, mail software, a web browser, and the like incorporated therein have made possible data communications through the Internet. Further, in the EV-DO at higher data transmission speed, importance of a data communication function is further increased, and it is assumed that a communication terminal function of PCMCIA card will be incorporated in a PC or a PDA.

Particularly, the PDA is generally small and is excellent in portability. Of course, the user can use the communication function singly with the PDA incorporating a communication function module. For example, however, when the user possesses different types of information processing devices such as a PDA incorporating a communication function and a notebook PC incorporating no communication function, if the communication function of the PDA can also be used from the notebook PC, it is convenient. In this case, the PDA incorporating the communication module requires relay means. On the other hand, while the notebook PC uses the communication function of the PDA, the function required for the PDA is only the communication function. However, since the whole PDA operates including other functions, unnecessary power consumption occurs.

SUMMARY OF THE INVENTION

An object of the invention is to provide an information processing device including a communication section for enabling an external device to use only the communication section.

The invention provides an information processing device having: a communication section for performing a communication process; a processing section for performing various processes of the information processing device; a connection terminal to connect an external device to the information processing device; and a switching section for switching a connection of the connection terminal to one of the processing device and the communication section, wherein the switching section switches the connection of the connection terminal based on an external instruction or a request from the external device connected to the connection terminal.

The term "switch" may include the case where the connection is switched by a physical switch and the case where the connection is switched by a logical or electronic switch; a predetermined input signal may be output to either.

According to the information processing device, the external device can selectively use either of the processing section and the communication section.

Furthermore, the information processing device has a power control section for controlling power supply to the processing section, wherein power control section stops the power supply to the processing section when the switching section switches the connection of the connection terminal to the communication section. Furthermore, the information processing device further has a power control section for controlling power supply to the processing section, wherein the switching section switches the connection of the connection terminal to the processing section if the power supply detecting section detects the power supply to the processing section, and switches the connection of the connection terminal to the communication section if the power supply detecting section does not detect the power supply to the processing section. Furthermore, the information processing device has a notification section for notifying a user of the information processing device that the connection terminal is connected to the communication section.

The invention also provides an information processing device, having: a communication section for performing a communication process; a processing section for performing various processes of the information processing device; a connection terminal to connect an external device to the information processing device; and a branch section for branching a connection with the connection terminal to the processing section and the communication section to transmit data input from the connection terminal.

According to the described information processing device, the external device can use both of the processing section and the communication section.

Furthermore, the information processing device has a switching section for switching between a first connecting condition that the connection terminal is connected to the processing section and the communication section through the branch section and a second condition that the connection terminal is connected to only the communication section not through the branch section, according to a condition of power supply to the processing section, wherein the switching section switches to the first condition when the processing section is powered, and switches to the second condition when the processing section is not powered. Furthermore, the switching section has: a first switching section provided between the connection terminal and the branch section; a second switching section provided between the branch section and the communication section; and a signal line connecting the first switching section and the second switching section.

Furthermore, the communication section is a communication module.

Conversion of any desired combination of the components described above and the representation of the invention among methods, apparatuses, systems, record media, computer programs, etc., is also effective as an aspect of the invention.

According to the invention, there can be provided an information processing device including a communication section for enabling an external device to use only the communication section.

DETAILED DESCRIPTION OF THE PREFERRED EMBODIMENTS

First Embodiment

A first embodiment of the invention relates to an information processing device incorporating a communication module. The information processing device has a CPU for executing various processing other than a communication processing. Usually, if the user operates to execute a program stored in a storage area in the information processing device, the CPU executes processing of the program. On the other hand, if the user operates to execute the communication processing, the CPU transmits information to be communicated to the communication module via a signal line between the CPU and the communication module, and the communication module conducts communications solely. The information processing device of the embodiment is provided with a connection terminal on the outside of a cabinet, and a signal line from the connection terminal is connected to the communication module to allow an external PC to use the communication module. To allow an external PC to use the CPU of the information processing device, a switch section is provided between the connection terminal and the communication module, and the signal line from the connection terminal is also connected to the CPU through the switch section. When the switch section connects the connection terminal and the communication module, power of the CPU is turned off.

Figure 1:
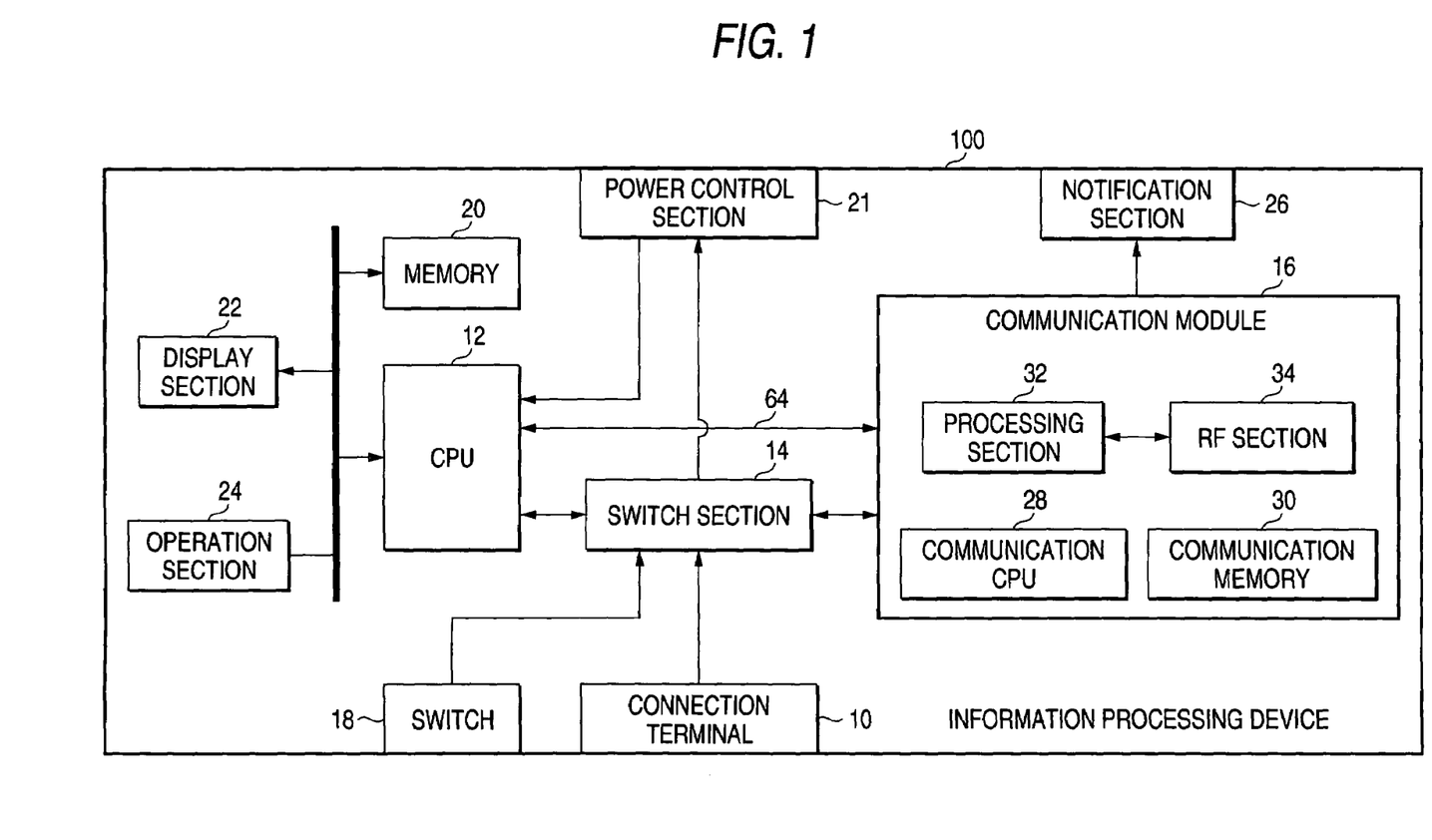
FIG. 1 is a block diagram to show the configuration of an information processing device according to a first embodiment of the invention.

FIG. 1 shows the configuration of an information processing device 100 according to the first embodiment of the invention. The information processing device 100 includes a connection terminal 10, a CPU 12, a switch section 14, a switch 18, a power control section 21, a memory 20, a display section 22, an operation section 24, and a notification section 26. The communication module 16 includes a communication CPU 28, communication memory 30, a processing section 32, and an RF section 34. Further, a communication module 16 provided as a different unit from the information processing device 100 is connected with the information processing device 100.

The CPU 12 executes various processing that can be executed in the information processing device 100. Particularly, the CPU 12 executes a program stored in the memory 20 in conjunction with the memory 20. For example, the program is document preparation, schedule management, mail client, etc. The memory 20 may temporarily store the program or may store the program until the program is deleted according to a predetermined instruction.

The communication module 16 executes communication processing based on EV-DO or cdma2000 1×. The RF section 34 executes transmission and reception processing of a radio signal, the processing section 32 executes modulation and demodulation processing of a baseband signal, spread processing and inverse spread processing, error correction processing, retransmission processing, etc. The communication CPU 28 executes control processing in the RF section 34 and the processing section 32. Further, subscriber information such as a telephone number provided by a common carrier, etc., is stored in the communication memory 30, and is read particularly by the communication CPU 28 as required.

The connection terminal 10 is a connector for communicating data to and from an external PC (not shown). The connection terminal 10 is implemented as a USB-B connector or a mini-B connector by way of example, and enables an external PC, etc., as a master machine to use the information processing device 100 as a slave machine.

The switch section 14 switches signal lines from the connection terminal 10 the CPU 12 or the communication module 16. The switch section 14 can switch between connection of the connection terminal 10 and the CPU 12 and connection of the connection terminal 10 and the communication module 16. When an external PC is not connected, the communication module 16 is controlled by the CPU 12, and thus the CPU 12 and the communication module 16 are connected directly by a communication data signal line 64 not through the switch section 14.

The switch section 14 connects the connection terminal 10 to the communication module 16 when the external PC connected to the connection terminal 10 requests to use a wireless line for Internet and e-mail transmission/reception through the communication module 16 in the information processing device 100. On the other hand, the switch section 14 connects the connection terminal 10 to the CPU 12 when the external PC requests the information processing device 100 to perform a process of the CPU 12 as like that the external PC accesses the memory 20 in the information processing device 100.

The switch 18 has a function for the user to instruct the switching of the switch section 14. In order to allow an external PC to use the communication module 16, the user operates the switch 18 so as to connect the connection terminal 10 and the communication module 16. In order to allow the external PC to use the CPU 12, the user operates the switch 18 so as to connect the connection terminal 10 and the CPU 12. When the switch section 14 connects the communication module 16 and the connection terminal 10 according to such operation, the external PC connected to the information processing device 100 can use the communication function of the communication module 16 via USB.

When the switch section 14 connects the CPU 12 and the connection terminal 10, the external PC is connected to the main unit of the information processing device 100 via USB, and synchronization of data of mail, schedule, address book, etc., in the memory 20, file transfer, and the like can be executed. When the switch section 14 connects the connection terminal 10 and the communication module 16 as the switch 18 is operated, the power of the CPU 12 is turned off. The switch 18 and the switch section 14 may be of three-state switch type so as to connect the communication module 16 and the CPU 12 in addition to connecting the communication module 16 and the connection terminal 10 and connecting the CPU 12 and the connection terminal 10.

The power control section 21 controls the power supply to the CPU 12 according to the switching condition of the switch section 14.

The display section 22 mainly displays the processing result of the CPU 12. It is a liquid crystal display, etc., by way of example; it may be a main display or when the information processing device 100 is of folding type and has a sub-display, the display section 22 may be the sub-display. In the case that the connection terminal 10 and the communication module 16 are connected by the switch section 14, the CPU 12 determines the state of the switch section 14 and displays a message to the effect that the function of the communication module 16 cannot be used from the CPU 12.

The operation section 24 is an interface for the user of the information processing device 100, and includes a keyboard, buttons, etc. The operation section 24 need not be hardware and may be a software keyboard, etc., displayed in the display section 22.

The notification section 26 is an LED, etc., controlled by the communication module 16. The notification section 26 can notify the user of the operation of the communication module 16 even if the CPU 12 is in a non-operating state. The notification section 26 notifies the user of the operation state of the communication module 16, such as operating/non-operating, communicating, or standby mode, blind spot, reception strength, etc., by color, on/off, blinking/non-blinking, blinking period, etc. With PCMCIA card type, etc., in a related art, an LED exists on the card, for example. However, if an LED is provided on the communication module 16 which is incorporated in the information processing device, the user cannot see the LED and thus the LED is provided on the cabinet of the information processing device 100 and is controlled from the communication module 16. If the information processing device 100 is off, the LED can be used.

The configuration can be implemented by a CPU, memory, and other LSIs of any desired computer as hardware and can be implemented by a program having a programming management function loaded into the memory, etc., as software. However, in the drawing, the configuration made up of the connection terminal 10, the CPU 12, the switch section 14, the communication module 16, etc., is drawn. Therefore, it will be obvious to those skilled in the art that the functional blocks can be implemented in various modes of hardware only, software only, or combination thereof.

Figure 2A:
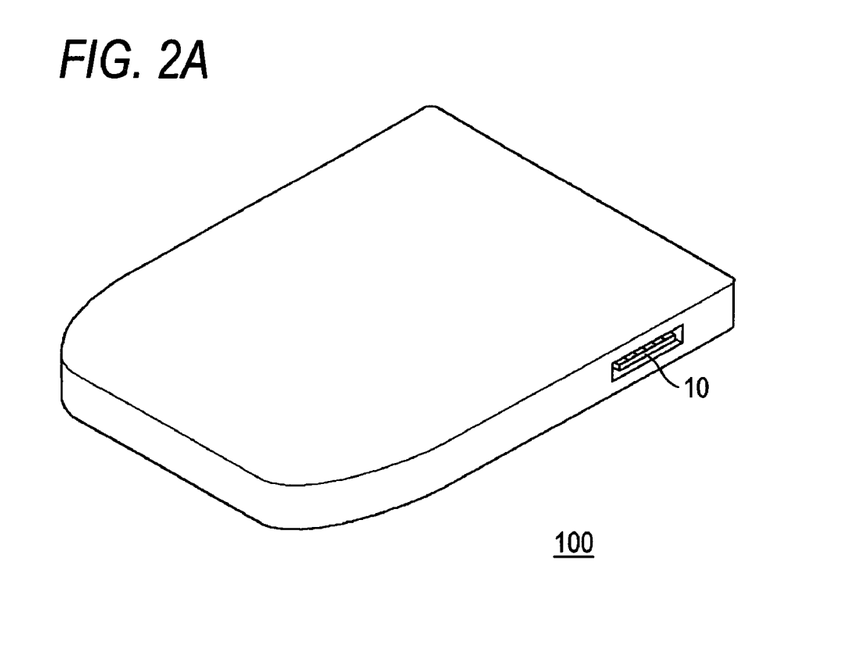
FIGS. 2A and 2B are drawings to show the back and the face of the appearance of the information processing device in FIG. 1.
Figure 2B:
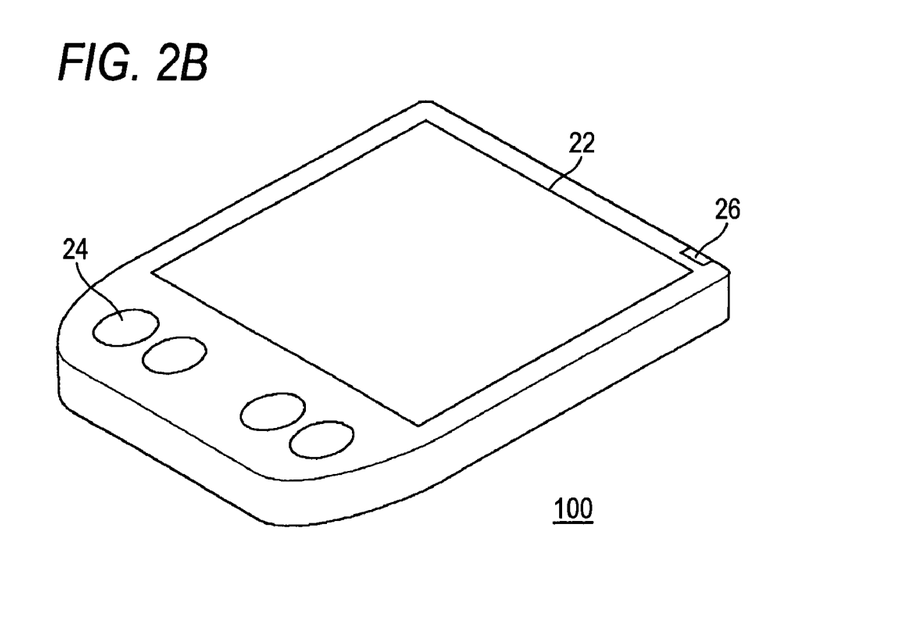

FIGS. 2A and 2B show the back and the face of the appearance of the information processing device 100. FIG. 2A shows the back of the information processing device 100. As shown in FIG. 2A, the connection terminal 10 is provided on a side of the cabinet of information processing device 100. FIG. 2B shows the face of the information processing device 100. The display section 22, the operation section 24, and the notification section 26 are provided on the face.

Figure 3:
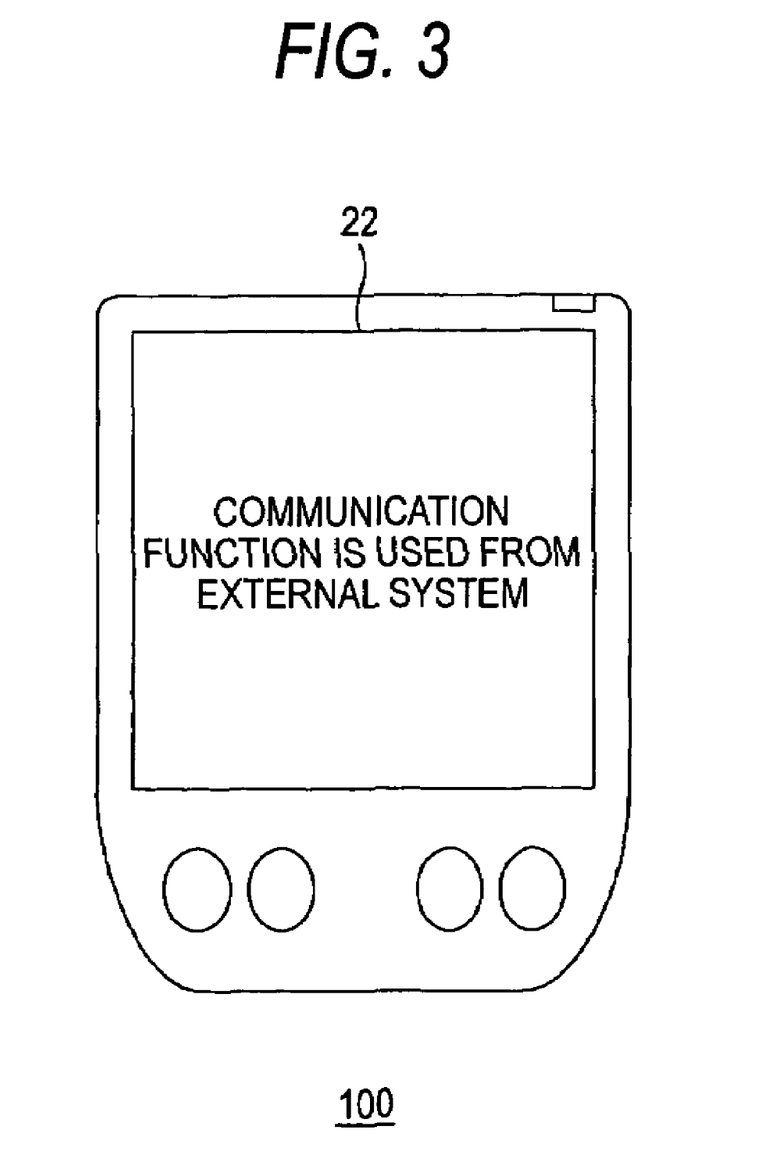
FIG. 3 is a drawing to show an example of display of a display section in FIG. 1.

FIG. 3 shows an example of display of the display section 22. The display section 22 may produce display for enabling the user to recognize that the communication module 16 incorporated in the information processing device 100 is used from the external PC, such as text display of "communication function is used from external system" or the like or any desired icon display.

According to the embodiment, only the communication module 16 incorporated in the information processing device 100 can be used from an external PC. When the external PC uses the communication module 16, a message to the effect that the external PC uses the communication module 16 is displayed on the display section 22, so that the user can easily recognize the operation. When the external PC uses the communication module 16, the notification section 26 notifies the user that the external PC uses the communication module 16, so that the user can easily recognize the operation. If the external PC uses the communication module 16, the power of the CPU 12 can be turned off, so that low power consumption is made possible.

Second Embodiment

A second embodiment of the invention relates to an information processing device incorporating a communication module like the first embodiment. The second embodiment differs from the first embodiment in the switching method of switch section. If power of a CPU is turned off, it is detected and the switch section connects a communication module and a connection terminal. On the other hand, in a usual state, the switch section connects the connection terminal and the CPU. The relationship between turning on or off power of the CPU and the switch timing of the switch section is opposite as compared with the first embodiment.

Figure 4:
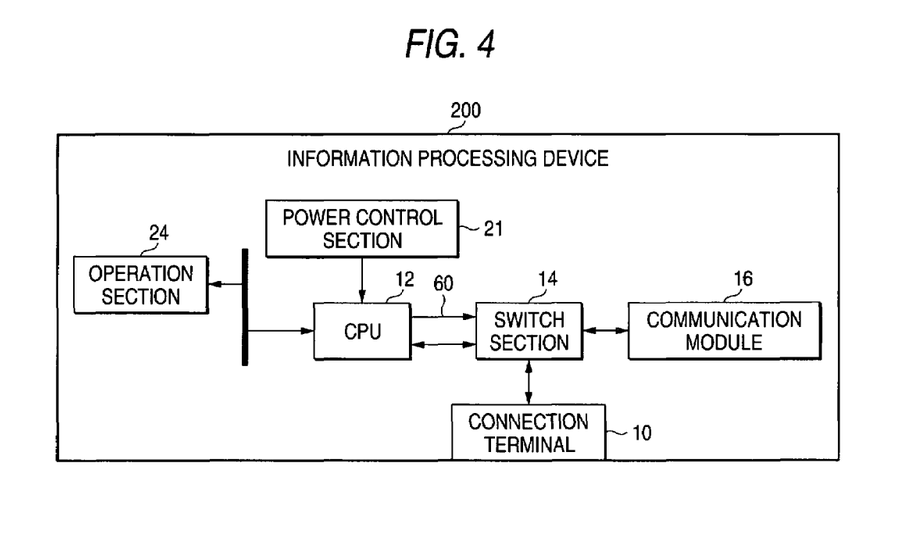
FIG. 4 is a block diagram to show the configuration of an information processing device according to a second embodiment of the invention.

FIG. 4 shows the configuration of an information processing device 200 according to the second embodiment of the invention. A control signal line 60 is added to the information processing device 200 in FIG. 4 as compared with the information processing device 100 in FIG. 1. In the information processing device 200 in FIG. 4, parts not relating to the description of the second embodiment, such as the notification section 26 of the information processing device 100 in FIG. 1, are not shown. In fact, the parts may exist.

The control signal line 60 is a control signal line for the CPU 12 to give a switching instruction to the switch section 14. With the control signal line 60, the switch section 14 is controlled by the CPU 12. When the power control section 21 controls to provide power to the CPU 12 so that power of the information processing device 200 is on, the CPU 12 and the connection terminal 10 are connected. On the other hand, when the power control section 21 controls not to provide power to the CPU 12 so that power of the information processing device 200 is off or in a sleep state by user operation through an operation section 24 or for any other reason, the communication module 16 and the connection terminal 10 are connected. The sleep state generally means a mode in which although power is partially supplied, the clock of the CPU 12, etc., is slowed down or is stopped for saving current consumption.

Accordingly, when the power of the information processing device 200 is on, the external PC is connected to the main unit of the information processing device 200 through the connection terminal 10, and synchronization of information, file transfer, and the like are made possible. When the power of the information processing device 200 is off or the information processing device 200 is in the sleep state, the external PC is connected to the communication module 16 through the connection terminal 10, and the communication function of the communication module 16 and the like can be used. Consequently, to use the communication function of the communication module 16 or the like, power consumption can be minimized regardless of the processing capability of the main unit of the information processing device 200. According to the embodiment, when the external PC uses the communication module 16, the power of the CPU 12 can be turned off, so that low power consumption is made possible.

Third Embodiment

A third embodiment of the invention relates to an information processing device incorporating a communication module like the first embodiment. In the first embodiment, the switch section switches between connection of the connection terminal and the CPU and connection of the connection terminal and the communication module. In the third embodiment, a branch section like a hub is provided in place of the switch section. According to the third embodiment, in the case that the user uses the CPU and the communication module from an external PC with frequently switching these, the switch processing explained in the first embodiment is unnecessary and both the CPU and the communication module can be used.

Figure 5:
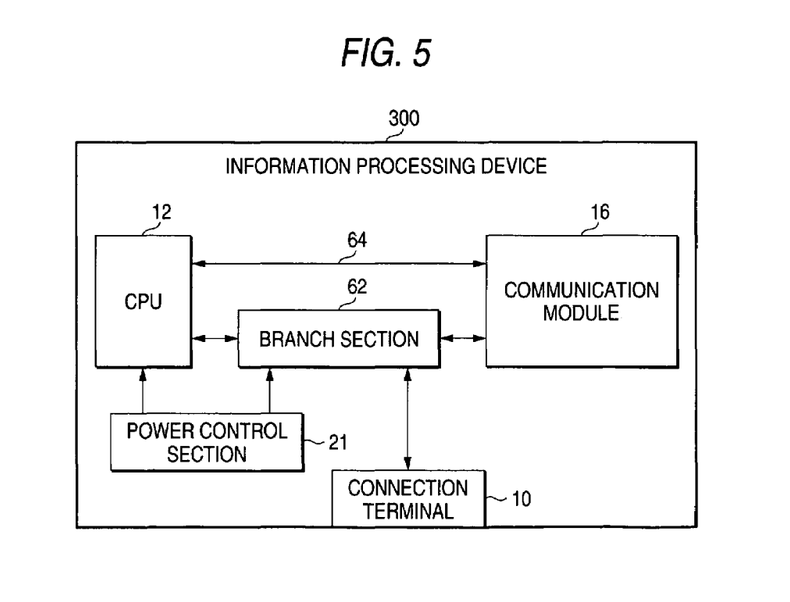
FIG. 5 is a block diagram to show the configuration of an information processing device according to a third embodiment of the invention.

FIG. 5 shows the configuration of an information processing device 300 according to the third embodiment of the invention. The switch section 14 is deleted and a branch section 62 is added to the information processing device 300 in FIG. 5 as compared with the information processing device 100 in FIG. 1.

A communication data signal line 64 connects a CPU 12 and a communication module 16, and the branch section 62 has a function of a USB hub for connecting the CPU 12 and a connection terminal 10 and connecting the connection terminal 10 and the communication module 16 at the same time. In the branch section 62, the connection terminal 10 is connected to the upstream side and the communication module 16 and the CPU 12 are connected to the downstream side. Accordingly, an external PC connected to the connection terminal 10 recognizes the information processing device 300 logically as three devices including the USB hub (the branch section 62), and it is made possible to simultaneously use the two devices of the communication module 16 and the CPU 12 on the downstream side of the branch section 62. Therefore, the communication function of the communication module 16 can be used and synchronization of information with memory 20 (not shown in FIG. 5), file transfer, and the like can be executed.

According to the embodiment, the external PC can use the communication function of the communication module 16 incorporated in the information processing device 300 and further can use a file, etc., stored in the information processing device 300, so that convenience is enhanced.

Fourth Embodiment

A fourth embodiment of the invention relates to an information processing device incorporating a communication module like the first embodiment. In the fourth embodiment, a first switch section is provided between the connection terminal and the branch section and a second switch section is provided between the branch section and a communication module and further a signal line not through the branch section is also provided between the first section and the second switch section in addition to the configuration of the third embodiment. In case that the communication module is used for an external PC, power of the CPU can be turned off and as the first and second switch sections are switched so that a signal can be prevented from entering the branch section. Further, the power of the branch section is also turned off. According to the configuration, the effect of low power consumption is added to the convenience of the information processing device according to the third embodiment.

Figure 6:
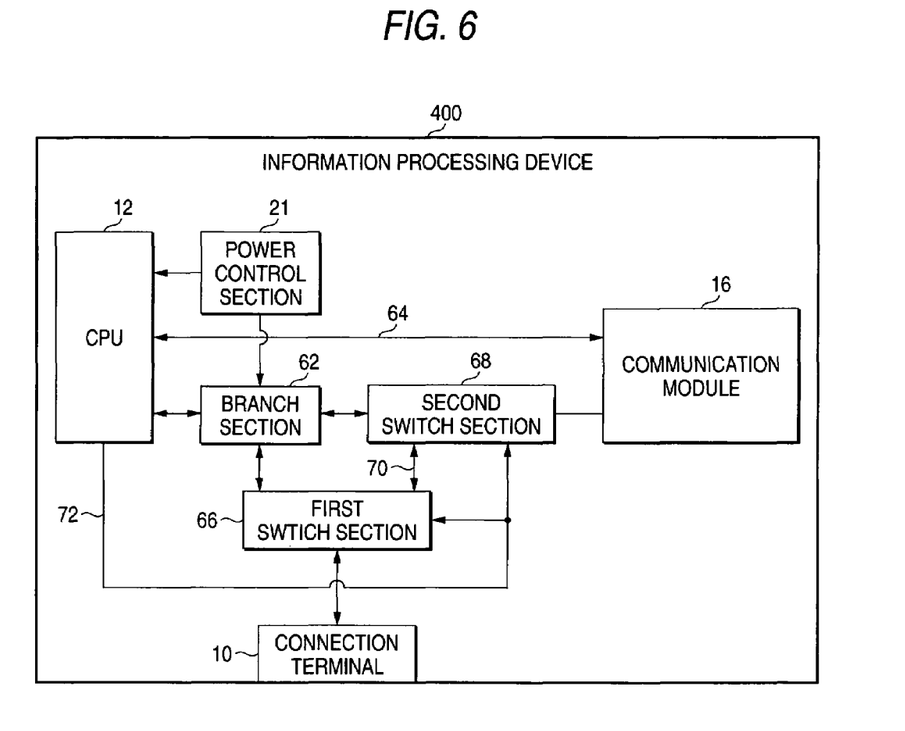
FIG. 6 is a block diagram to show the configuration of an information processing device according to a fourth embodiment of the invention.

FIG. 6 shows the configuration of an information processing device 400 according to the fourth embodiment of the invention. A first switch section 66, a second switch section 68, a bypass signal line 70, and a control signal line 72 are added to the information processing device 400 in FIG. 6 as compared with the information processing device 300 in FIG. 5.

The first switch section 66 is provided between the connection terminal 10 and the branch section 62. The first switch section 66 switches the connection of the connection terminal 10 into either the branch section 62 or the bypass signal line 70. The second switch section 68 is provided between the branch section 62 and a communication module 16. The second switch section 68 switches the connection of the communication module 16 into either the branch section 62 or the bypass signal line 70. Switching of the first switch section 66 and the second switch section 68 is controlled by a CPU 12 via the control signal line 72. When power of the CPU 12 is on, the first switch section 66 and the second switch section 68 are switched so as to connect the communication module 16 and the connection terminal 10 through the branch section 62. When power of the CPU 12 is off or the CPU 12 is in a sleep mode, the first switch section 66 and the second switch section 68 are switched so as to connect the communication module 16 and the connection terminal 10 directly through the bypass signal line 70 not through the branch section 62. According to the configuration, when power of the CPU 12 is on, an external PC can use the communication module 16 and the main unit of the information processing device 100 simultaneously as with the third embodiment. When power of the CPU 12 is off or the CPU 12 is in the sleep mode, the communication function of the communication module 16 can be provided for the external PC connected to the connection terminal 10 without occurring power consumption of the branch section 62, etc.

According to the embodiment, the external PC can use the communication function of the communication module 16 incorporated in the information processing device 400 and further can use a file, etc., stored in the information processing device 400, so that convenience is enhanced. In addition, when only the communication module 16 is used, the power of the branch section 62 can also be turned off and thus low power consumption can be realized.

The invention has been described based on the embodiments. It is understood by those skilled in the art that the embodiments are illustrative and that various changes and modifications may be made in the invention without departing from the spirit and scope thereof.

In the first to fourth embodiments, the information processing devices 100 to 400 are for example PDA, but may be any other than PDA and may be PC. According to the modification, the invention can be applied to various information processing devices. That is, the information processing device may be any if it can process digitalized information. Furthermore, the power control section 21 shown in FIGS. 1 and 4 to 6 is not limited to the above embodiments.

The first embodiment can also be combined with the second and fourth embodiments. According to the combination, as the switch section 14, the first switch section 66, and the second switch section 68 switch, a predetermined message is displayed on the display section 22 and the notification section 26 provides the user with predetermined information in the second and fourth embodiments.

What is claimed is:

1. An information processing device comprising:
    a communication module for performing a communication process;
    a memory storing a program;
    a processing section for executing the program stored in the memory;
    a connector to connect an external device to the information processing device;
    a branch section for branching a connection with the connector to the processing section and the communication module to transmit data input from the connector; and
    a switching section for switching between a first connecting condition that the connector is connected to the processing section and the communication module through the branch section and a second condition that the connector is connected to only the communication module not through the branch section, according to a condition of power supply to the processing section,
    wherein the switching section switches to the first condition when the processing section is powered, and switches to the second condition when the processing section is not powered.

2. The information processing device according to claim 1, wherein the switching section has:
    a first switching section provided between the connector and the branch section;
    a second switching section provided between the branch section and the communication module; and
    a signal line connecting the first switching section and the second switching section.

* * * * *